United States Patent Office 3,407,436
Patented Oct. 29, 1968

3,407,436
METHOD AND APPARATUS FOR ELECTROSTATICALLY SECURING FILM TO AN OBJECT
Kelvin G. Anderson, Greer, and Ivan F. Churchill, Greenville, S.C., assignors to W. R. Grace & Co., Duncan, S.C., a corporation of Connecticut
Original application May 6, 1964, Ser. No. 365,272. Divided and this application June 2, 1966, Ser. No. 615,269
2 Claims. (Cl. 18—1)

ABSTRACT OF THE DISCLOSURE

Apparatus for shrinking a heat shrinkable thermoplastic member about an object comprising first and second electrodes spaced apart from each other, means for applying a direct current potential across said electrodes, and means for heating a portion of the space between said electrodes.

---

This application is a division of my prior copending application Ser. No. 365,272, filed May 6, 1964, now Patent No. 3,274,302.

This invention relates to the securing of dielectric materials to an object. In one aspect, the invention relates to restraining the movement of thermoplastic film in contact with an object. In another aspect, the invention relates to the heat shrinking of a thermoplastic film.

It is well known to wrap or otherwise encompass objects in a wrapping film for the purpose of protecting the object from damage or contamination. One of the most useful types of wrapping materials is organic thermoplastic sheet or film. However, a problem with these materials is that they are difficult to transport or convey through automatic wrapping equipment due to their flimsiness. No satisfactory solution has been found for the problem of holding this thin film in position while being transported through the wrapping machines. Consequently, frequent wrinkling occurs resulting in a high number of rejected products, costly shut-downs or unsightly packages. A still further difficulty arises when these films are placed over objects which are then subjected to heat to cause heat shrinking of the film around the object. One specific use for this type of application is the formation of a shrink cover for containers having a lip. Again a difficulty is in the positioning of film over the container and holding the film during shrinking to control the shrinking, particularly when it is desired to form a tape or lock around the lip or edge or other projection of the object.

It is an object of the invention to provide a method and apparatus for enclosing objects in flexible dielectric materials.

It is another object of the invention to provide a method and apparatus for restraining movement of a relatively thin, flexible, dielectric material.

It is another object of the invention to provide a method and apparatus for heat shrinking a heat shrinkable organic thermoplastic film-like member.

It is another object of the invention to provide a method and apparatus for preparing a cover for a container.

These and other objects of the invention will be readily apparent to those skilled in the art from the following disclosure, claims, and drawings.

These and other objects of the invention are broadly accomplished by the use of electrostatic force to restrain movement of a dielectric material placed on an object.

It has now been found that when an object is placed between electrodes chargeable to opposite polarities and a flexible dielectric material, such as an organic thermoplastic film, is placed over the object with the peripheral portions extending beyond the periphery of said object, that the application of a potential across the electrodes results in the electrostatic charging of the film to a polarity opposite that of one of the electrodes to which the peripheral portions of the film is thereby attracted. If the object is placed on a support which is also an electrode, then the film will be attracted to the support and will position the film on the object.

In another embodiment of the invention, the electrostatically restrained film is then subjected to sufficient heat to shrink the film with the shrink energy of the film overcoming the restraining force of the electrostatic charge.

Suitable apparatus for carrying out the invention includes a pair of spaced electrodes, means for applying a potential across said electrodes and means for heating the space between or around said electrodes.

It has also been found that by adjusting the electrostatic force that the temperature required to shrink the film can be increased to a temperature above that normally required for a heat shrinking application, especially when the film is in direct and intimate contact with the electrode.

The invention is useful for virtually any dielectric material, including but not limited to, organic thermoplastic polymeric films, sheets, netting, filaments, and the like made of polyolefins such as polyethylene, polypropylene, and the like, vinylchloride copolymers, polyamides including nylon and the like. The term "polymer" as employed herein includes homopolymers, copolymers, terpolymers, block copolymers, laminates of films and the like. The invention is useful for any structural shape so long as the material is a relatively thin flexible electrically non-conductive member which may be depressed by the electrostatic force. The thickness of the material can vary depending on the potential employed, for example, from ½ mil to 10 mils. Preferably, the dielectric material is a biaxially oriented polyolefin or polyviynl (e.g. polyethylene, polypropyene or polyvinyl chloride) film or sheet ½ to 5 mils in thickness. The dielectric material may be unoriented, monodirectionally or bidirectionally oriented but, of course, will be oriented if it is to be shrunk. The material may also be irradiated such as shown in the patents to Baird, U.S. 3,022,543, and Rainer et al., U.S. 2,877,500, incorporated herein by reference.

The object to be enclosed, covered, or wrapped with the dielectric material can be any shape. A preferred shape or structure, particularly for heat shrinking operations, is one that provides for a lip, rim, edge or other projection on the upper surface which will permit the shrinking film to removably lock around said lip, etc. A particularly useful object is a container having an orifice in the upper portion thereof and a lip or rim defining said orifice.

The invention is best described with reference to the drawings.

Figure 1:
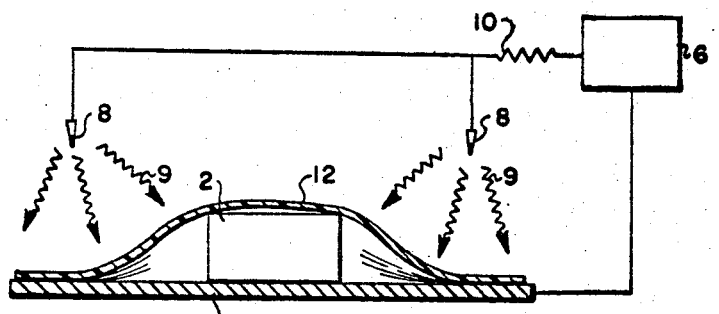
FIGURE 1 is a schematic illustration of one embodiment of an invention illustrating the holding of a film in place over an object.

FIGURE 1 is a schematic illustration representing the employment of the invention for holding a film onto a surface of an object. For example, if the film is to be held onto an object passing through equipment subjected to air currents or the like, the object 2 may be placed onto support 4 which may also double as a grounded electrode. Preferably, this support comprises a substantially flat electrically conductive plate connected to a direct current high-voltage power source 6 which is also connected to a second pointed electrode 8. The electrodes are connected by suitable means to the power source so as to be of opposite polarity. Preferably a high value resistor 10 is connected in series with the electrode 8 to limit current drawn to the electrodes and to prevent arcing across the gap between the electrodes. The drawing illustrates the employment of two pointed electrodes; however, the exact number of the electrodes is not critical so long as a uniform electrostatic force field is generated. Selection of electrodes and their shape is within the skill of the art. Preferably, the charging electrode has a projection on it, such as a pointed electrode. The lower electrode 4, especially the surface thereof, may if desired be coated with a thin coat of a friction-reducing material such as polyethylene, polypropylene, polytetrafluoroethylene or the like. The electrode 4 is preferably a smooth flat surface or may be a reticular plate but in all cases it must be comprised of a conductive material such as metal, wood, paper pulp or the like. The film 12 is placed on the supported object 2 and then subjected to the force field 9 thereby becoming charged to a polarity opposite that of electrode 4 which is grounded. The invention has been shown in perhaps its most useful form, that is with the object resting on an electrode support, which may also be a conveyor, so that the film is drawn downwardly toward a support; however, it is also within the scope of the invention to turn the entire operation up side down or in any other position so long as suitable means are provided for supporting the object between the spaced electrodes. The film is now in position to be subjected to any type of operation which requires the film to be held over the object.

The potential to be established between electrodes 4 and 8 may suitably be in the range from about 1 to about 200, preferably from 5 to 50, kilovolts with a current limiting resistor from 2 to 500 megohms. The spacing between the electrodes is not particularly critical and can be varied depending upon the voltage applied and the mode of electrode inter-connecting. The polarity is not critical so long as the electrostatic forces created by the opposing electrodes charge the surface of the film 12 so as to attract the film in such a manner as to enclose the product. For example, this invention could be used for restraining the film over an object between vertically spaced electrodes if the object is suitably supported.

Figure 2:
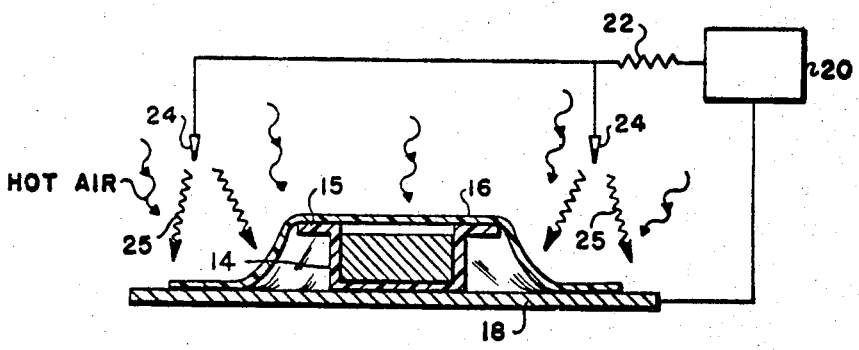
FIGURE 2 is a schematic illustration of a second embodiment illustrating the formation of a shrink cover around a container.
Figure 3:
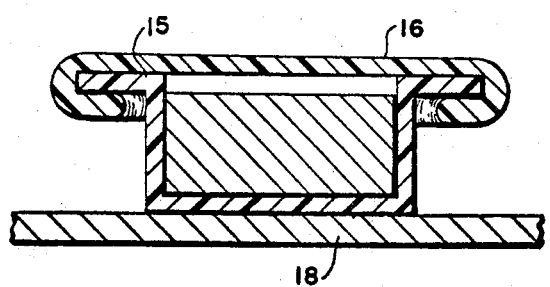
FIGURE 3 is a schematic illustration showing the film after it has been heat shrunk to form a cover.

FIGURE 2 is a schematic illustration of another embodiment of the invention whereby the electrostatic forces restrain movement of the film while the film is subjected to heat shrinking forces sufficient to shrink the film about the object. The object, which in this case is best illustrated by a container 14 having a lip 15 with a film 16 placed thereover, is placed onto an electrode support 18. The dimensions of the film are sufficient so that at least a portion thereof extends beyond the periphery of the container and over the edge, preferably for sufficient distance to contact the plate 18 when depressed, unless a conductive tray is used. In addition to the use of a flat supporting electrode to which the film is attracted, a conductive tray or object is employable, e.g. a metal tray, so that the film is attracted to the tray instead of the electrode support. Again, the plate electrode 18 is connected to a suitable high voltage direct current power source 20 which is connected through a resistor 22 with a pointed electrode 24. The operation of the electrical system is essentially the same as that described for FIGURE 1 so as to provide a force field 25, except that the system is simultaneously subjected to heat sufficient to cause shrinkage of the film about the container. Since the electrostatic force causes attraction of the film 16 to the electrode support 18, there is a pressure exerted by the charge which causes the film to resist shrink forces and to shrink in a controlled manner. Heat may be applied by any suitable means such as radiant heaters or by direct hot gases such as hot air as shown in FIGURE 2. This heat may be applied to any portion of the film by the use of a directing conduit or indirectly by means of a heat shrinking tunnel where the hot air is fed into the tunnel so as to not disturb the film position by its kinetic energy.

This invention is particularly useful when it is required to pull the plastic film around an object to form a tape or lock thereby causing the film to remain in place even when additional heat energy is applied to other areas of the plastic.

Generally, the film will cover the entire upper portion of the container but it is sometimes desirable to only partially enclose or cover the container.

In addition, this method and apparatus of heating and applying electrostatic pressure simultaneously can be used to heat the film beyond the temperature where shrink would normally occur if sufficient electrostatic pressure is exerted.

The selection of the proper temperatures is well within the skill of the art and depends on the type of film and its orientation.

Figure 4:
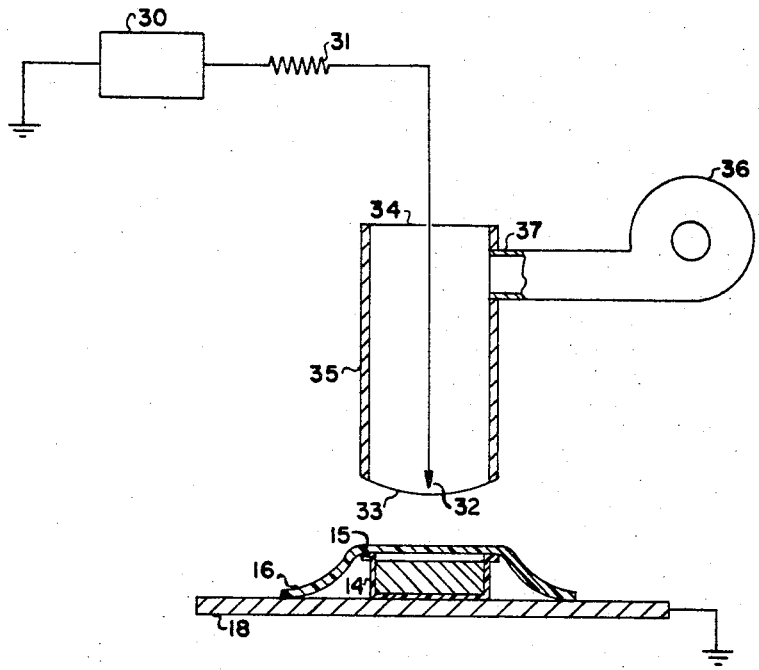
FIGURE 4 is a schematic illustration of one embodiment of an apparatus according to the invention.

The invention is best illustrated by FIGURE 4: A 12 inch length of insulated tubing 35 was connected to a hot air nozzle 37 which was in communication with a hot air blower 36 capable of supplying enough hot air to shrink irradiated biaxially oriented polyethylene film 16 prepared by the method described in the patent application to Baird et al. U.S. 3,022,543. In the center of the circular end 33 of the tube 35 furtherest from the supply of the hot air 36 was mounted a sharp pointed metal wire 32 in such a way that the hot air would blow toward and around the point. This pointed wire 32 or electrode was connected to a high voltage D.C. power supply 30 (polarity not important) with an output adjustable from zero to 60 kv. at 1 ma.

A 500 megohm resistor 31 was inserted in series with the lead to the electrode to prevent danger from electrical shock and also to prevent arcing.

A metal plate 18 slightly larger than the 10 inch by 10 inch film was connected to ground. This plate 18 also acted as a support for the object to be wrapped and for the sheet of irradiated biaxially oriented polyethylene film 16 which was draped over the object.

A number of trays 14 of a variety of shapes, some being electrical conductors and others being made from insulating material, were obtained.

Blocks of wood were inserted into the trays 14 to simulate a product. The hot air nozzle containing the electrode 32 was held from 2 inches to 10 inches above the tray 14 which had been draped with film 16 and moved in a circular motion around the tray. A voltage of approximately 40 kv. was applied to the electrode.

The electrostatic pressure caused the film 16 to adhere to the metal plate 18, however, the shrink energy of the film was sufficient, in this case, to cause the film to slip on the plate and drag inwardly around the base of the tray 14. Since the trays 14 were fitted with a lip 15 around the circumference, the film was caused to mechanically lock around this lip.

While certain examples, structures, composition and process steps have been described for purposes of illustration, the invention is not limited to these. Variation and modification within the scope of the disclosure and the cliams can readily be effected by those skilled in the art.

We claim:

1. Apparatus for shrinking a heat shrinkable thermoplastic member about an object comprising, in combination:
(a) a first upper pointed electrode,
(b) a second substantially flat lower electrode support for said container spaced apart from (a),
(c) means for applying a direct current electrical potential across said electrodes and,
(d) means independent of said electrodes for simultaneously directing a heated gas from above into the space between said electrodes while applying said potential.

2. The apparatus of claim 1 wherein said means for heating comprises a conduit connected to a source of hot gas axially positioned relative to said first electrode and directed toward said second electrode.

References Cited

UNITED STATES PATENTS

| | | | |
|---|---|---|---|
| 2,168,027 | 8/1939 | Gladding | 18—8 |
| 2,185,417 | 1/1940 | Norton | 18—8 |
| 2,810,426 | 10/1957 | Till et al. | 18—8 XR |
| 2,204,617 | 6/1940 | Peel et al. | 18— 6 XR |
| 2,323,191 | 6/1943 | Bennett et al. | 18—6 |
| 2,464,403 | 3/1949 | Klingaman | 219—6.5 XR |
| 2,565,003 | 8/1951 | Simorda | 18–6 |
| 2,623,981 | 12/1952 | Anderson | 219—6.5 XR |
| 2,737,566 | 3/1966 | Wupperman | 219—10 |

WILLIAM J. STEPHENSON, *Primary Examiner.*